April 2, 1957  G. E. DIETZ ET AL  2,787,739
ELECTROMAGNETICALLY OPERATED CONTROL DEVICE
Filed Aug. 2, 1952  5 Sheets-Sheet 1

INVENTORS:
Gerald E. Dietz and
Adolph J. Hilgert
By: [signature]
Attys.

United States Patent Office 2,787,739
Patented Apr. 2, 1957

2,787,739

ELECTROMAGNETICALLY OPERATED CONTROL DEVICE

Gerald E. Dietz and Adolph J. Hilgert, Milwaukee, Wis., assignors to Milwaukee Gas Specialty Company, Milwaukee, Wis., a corporation of Wisconsin Application August 2, 1952, Serial No. 302,346

12 Claims. (Cl. 317—133.5)

This invention relates, in general, to electromagnetically operated control devices of the type powered by a source of electric energy such as that provided by a single thermocouple or a thermopile or similar source of small electric energy.

The present invention may be more particularly characterized as relating to improvements in an electric relay or electromagnetic switch having particular utility for automatically controlling, for example, from a low power source of electric energy a higher powered electric circuit, for example, for an electroresponsive valve for controlling a flow of fluid such as the flow of fuel for heating or similar or desired apparatus.

Control apparatus of the character described herein has implicit therein a fail-safe aspect in that if the source of small electric energy fails, for example, if a pilot burner which heats a thermoelectric generator to provide the small electric energy is extinguished, the switch or relay opens, thereby deenergizing, for example, a solenoid or electroresponsive valve which operates to interrupt the flow of fuel, for example, to a main burner, and further the switch or relay, since it is able to reclose even though powered from a single thermocouple, eliminates the necessity of manually resetting the switch or relay.

In the provision of apparatus of the aforementioned character certain basic considerations must be kept in mind. In apparatus having the features described the power for operating the relay or other electromagnetically operated control device is very small, the output of a thermocouple being under ordinary circumstances in the order of 5.5 milliwatts or about 20 millivots to a matched load. On the other hand, the controlled circuit may be, for example, of as much as ¼ H. P. at 115 or 230 volts A. C., .06 ampere at 230 volts D. C., 8 amperes at 115 volts A. C., or 4 amperes at 230 volts A. C. It is, therefore, necessary to make the most efficient use of the small electric energy for powering the relay or other electromagnetically operated control device.

Accordingly, a primary object of the present invention is to provide an electromagnetically operated control device powered solely and directly from an internally generated source of electrical energy, such as a thermoelectric generator or thermocouple, which device minimizes inefficiences in power utilization ordinarily inherent in device of this character to provide a device of capacity sufficient to permit use thereof for the purposes described or similar or other desired purposes.

Another object is to provide in an electromagnetically operated control device of the character described means for maintaining a minimum air gap to reduce the effects of residual magnetism of the power unit upon the armature, thereby permitting biasing means for biasing the armature to retracted position to have a lower value to reduce the magnetic pull necessary to attract the armature but affording the biasing means sufficient force to overcome the residual magnetism of the power unit for retraction of the armature.

Another object is to provide biasing means of the aforementioned character which comprises a contact spring carrying a contact to be actuated in one direction by the movement of the armature and in the opposite direction by the contact spring.

Another object is to provide means in which energy is stored by final movement of the armature to attracted position for release upon deenergization of the power unit to aid the biasing means in overcoming residual magnetism of the power unit in movement of the armature to retracted position.

Another object is to provide energy storing means of the last mentioned character which comprises a second contact spring carrying a contact for coaction with the first mentioned contact and wherein the second contact spring is effective upon deenergization of the power unit and retraction of the armature to cause the second contact carried by the second contact spring to tend to follow the cooperating contact providing contact pressure until the cooperating contact has acquired a given velocity of movement (in opposition to residual magnetism, which decreases as the armature air gap increases).

Another object is to provide biasing means for biasing the armature to retracted position and more particularly a contact spring effective for this purpose and which has a low spring rate which is correlated to the pull curve of the power unit so as to provide faster increase in the rate of the magnetic pull than in the spring rate of the contact spring beyond the point in the movement of the armature to attracted position where the bias of the spring is overcome by the magnetic pull on the armature, thereby effecting fast action of the contact in one direction with quick-make and/or quick-break between this contact and one or more coacting contacts.

Another object is to provide a device wherein upon deenergization of the power unit the residual magnetism drops off much faster than the spring rate of the contact spring biasing the armature to retracted position the difference affording the contact carried by the armature biasing spring the desired velocity in the opposite direction with quick-break and/or quick-make between this contact and the one or more coacting contacts.

Another object is to provide in a device of the character described an adjustable screw or similar means for adjusting the armature air gap in relation to the contact air gap and which will afford adjustment of the pull-in current, i. e., location of the point in the movement of the armature to attracted position where the bias of the armature biasing spring is overcome by the magnetic pull on the armature.

Another object is to provide in a device of the character described an adjustable screw or similar means which functions as a backstop for the armature, that is, fixes maximum armature air gap so that the latter is not increased to a value beyond which would cause objectionable departure from the desired pull curve of the power unit at a given location of the point in the movement of the armature to attracted position where the bias of the armature biasing spring is overcome by the magnetic pull on the armature.

Another object is to provide adjustable screw or similar means of the last mentioned character which functions in addition to prevent the armature from jumping its pivots.

Another object is to provide a device wherein the engagement of the contact carried by the armature biasing spring with a cooperating contact upon energization of the switch or relay affects the spring rate of the armature biasing spring and tends to bend it at or near the contact carried by the biasing spring to impart to the latter a slight rocking or wiping movement both on making and breaking contact with the cooperating contact which is advantageous in eliminating any sticking or tendency of the contacts to weld.

Another object is to provide an improved electromagnetically operated switch or relay powered solely and directly from a source of small electric energy and adapted for controlling a controlled circuit for a solenoid or other electroresponsive valve or the like and wherein the latter or controlled circuit may be provided with condition responsive means in circuit therewith for controlling same responsive to changes in a condition.

Further objects and advantages and numerous modifications and adaptations of the invention will appear from the following detailed description taken in connection with the accompanying drawings.

In the drawings the numeral 1 indicates a case or housing within which the electromagnetically operated control device indicated, in general, at 2 is enclosed. The open back of the housing 1 is closed by a removable base plate 3 secured to the housing 1, for example, by screws 4, and preferably with an insulator pad 5 interposed therebetween. The lower end of the base plate 3 has an outstanding flange 6 spaced downwardly from the bottom of the housing 1 the function of which will be hereinafter described.

The electromagnetically operated control device 2 comprises a power unit which includes a pair of core pieces 7 and 8, a yoke 9 common to both core pieces 7 and 8 at one end, a pair of pole pieces 10 and 11 one at the opposite end of each core piece 7 and 8, and coils 12 and 13 wound around core pieces 7 and 8 respectively between the yoke 9 and pole pieces 10 and 11. The structure of the power unit of the electromagnetic operator, particularly in respect of the yoke, pole pieces and core posts, may be, in general, of the form more fully illustrated and described in the copending application of Donley S. Collins, Gerald E. Dietz and Adolph J. Hilgert, Serial No. 249,778, filed October 4, 1951. Suffice it in this respect to state that the core preferably has enlarged yoke and pole pieces provided with coaxial openings; that the core posts preferably have their opposite ends expanded into the openings and thereafter heat treated to deform and join the grains of metal so that the yoke, pole pieces and posts are in substantially one piece; that the coils are wound around the posts and between the yoke and pole pieces; that the movable armature is preferably at least equal in area to the pole faces of adjacent pole pieces; and that the thermocouple or other low power source of electric energy to be hereinafter described is connected in circuit with the coils. It may be further noted that the coils 12 and 13 or energizing windings are distributed on the several core pieces 7 and 8 and that the axis of rotation of the armature 16 to be presently described is parallel to the alignment of the pole faces of the pole pieces 10 and 11.

The assembly comprising the core posts 7 and 8, coils 12 and 13, yoke 9 and pole pieces 10 and 11 is carried by one arm of an angular fulcrum plate or bracket 14 which is secured, for example, by a binding head screw 15 to the bottom wall of the housing 1. The armature 16 is pivoted by pointed screws 17 on the adjacent end of the other arm of the bracket 14 and carries an adjustment screw assembly which comprises as shown in detail in Figure 8 an adjustment screw 18 externally threaded and screwed through the armature 16 and an insulating pin 19 having a reduced end fixed in the screw 18. The opposite end of the enlarged part of the pin 19 is rounded at 20 and has a reduced stem 21 projecting axially therefrom.

The armature 16 is biased to retracted position by a first contact spring 24 which may be of generally U-shaped form as shown and has one end connected at 25 in circuit with a lead-in terminal 26. The other end of the spring 24 carries a contact 27. The projecting stem 21 of the screw 18 projects through an aperture in the adjacent arm of the spring 24 and the rounded end of the insulating pin 19 has abutting coaction with this arm of the spring 24. In the particular embodiment of the invention selected for illustration the switch part of the relay is a single-pole double-throw form in which the contact 27 is biased into contact with a contact 28 by the bias of the contact spring 24. The contact 27 is actuated out of contact with the contact 28 and into contact with a contact 29 by movement of armature 16 to attracted position. The contacts 28 and 29 are carried by contact springs 30 and 31 connected at 32 and 33 to lead-in terminals 34 and 35 respectively. The terminals 26, 34 and 35 are secured to an insulating terminal block 36 which is secured in place within the insulating housing 1.

It is to be understood that the contact 28 may be omitted or replaced by a stop or the contact 29 may be omitted, the switch in the first case then being of single-pole, single-throw, normally open form, and in the second case being of single-pole, single-throw, normally closed form. If the contact 29 is omitted the spring 31 will not be omitted except where the push-off force of this spring 31, to be presently described, is not required. Where this push-off force is not required the spring 31 may also be omitted.

Figure 7:
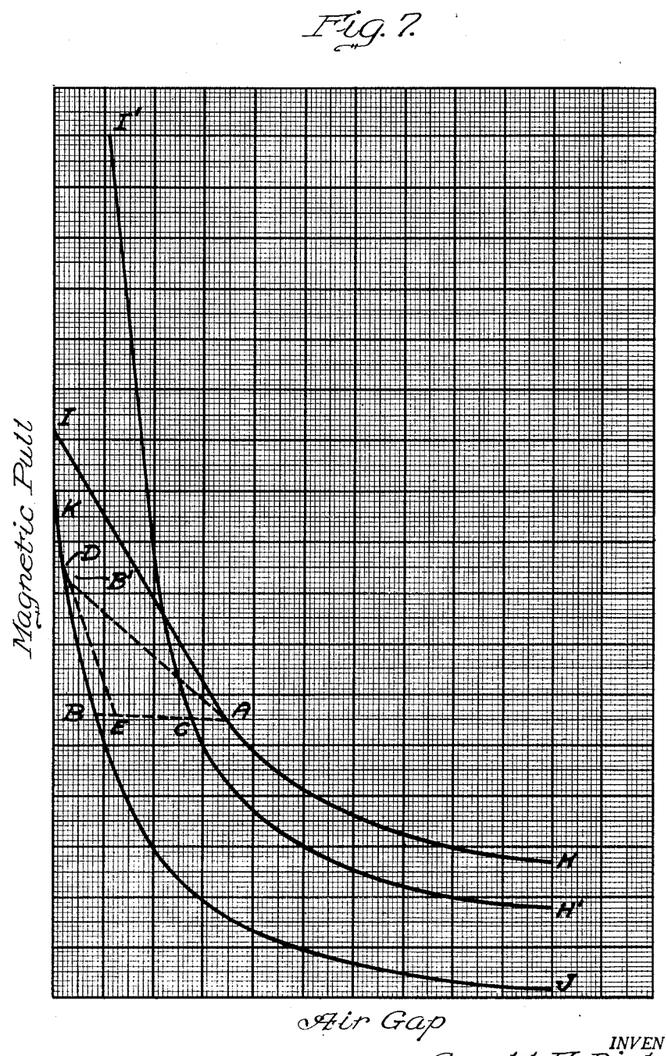
Figure 7 is a graphic representation of the performance characteristics of the electromagnetically operated control device embodying the present invention.

Referring to the performance chart shown in Figure 7, the power unit of the type described provides relatively high values of pull curve HI of the power unit, i. e., high magnetic attraction for a given armature air gap. The armature movement is, of course, related to contact movement and, hence, the armature air gap is related to contact air gap. The relay to have the desired capacity or rating must provide sufficient contact air gap, sufficient contact pressure, fast, or even snap, contact movement to prevent arcing, and sufficient contact separation force to overcome sticking or welding of the contacts. With reference to contact 28, contact pressure is provided by the biasing spring 24, while as to contact 29, contact separation force is provided by the spring 24 (acting in opposition to the residual magnetism of the power unit). Spring leaf 31 provides contact pressure between contacts 27 and 29. Magnetic attraction of the armature 16 provides contact separation force in the case of contact 28, such movement of the armature effecting movement of the contact 27 in opposition to the force of the spring 24.

The contact air gap is related to armature air gap, since the movable contact travels a distance proportional to armature travel. The magnetic pull is, of course, a function of armature air gap and increases as the armature air gap decreases, when the power unit is energized, while the effect of residual magnetism upon deenergization of the power unit decreases as the air gap increases (curve JK in Figure 7). The velocity of contact movement upon energization of the power unit is a function of the relationship of magnetic pull to the spring rate of the biasing spring 24, and upon deenergization of the power unit is a function of the relationship of residual magnetism to the spring rate of the spring 24.

The force exerted by the spring 24 must on one hand be sufficient to give good contact pressure, and sufficient to overcome residual magnetism; while, on the other hand, the force of the spring 24 must not exceed the magnetic pull at any given air gap (i. e., it must not be greater than the power available from the power unit when the armature 16 is being attracted or the contact 27 cannot be closed into contact with the contact 29). The armature air gap should, on one hand, be as large as possible to give maximum contact air gap; while, on the other hand, it must be small enough to permit attraction of the armature 16 toward the pole pieces 10 and 11 against the force of the spring 24.

With the power available as aforementioned, utilization of the power unit of the previously referred to copending application of Donley S. Collins, Gerald E. Dietz and Adolph J. Hilgert provides efficient utilization of power and the curve H'I' graphically illustrated in Figure 7 may be considered as representing the pull curve or the magnetic pull of that device on the armature in relation to armature air gap (measured at any convenient point between the armature 16 and the pole pieces 10 and 11 or their extended surfaces) which pull increases, as depicted, as the air gap decreases. If any restraining force on the armature is greater than the magnetic pull at any point of its travel, the armature cannot continue to move. The curve JK represents the force necessary to overcome the residual magnetism of the iron of the power unit and to push the armature 16 away from the pole pieces 10 and 11. It will be noted that full energization of the power unit with the pull curve H'I' does not saturate the iron path of the power unit.

In contrast, the power unit of the relay of the present application, whose pull curve is represented by the curve HI in Figure 7, provides saturation of the iron of the power unit as indicated by the curve. This results in sacrifice of power at the upper end of the curve (end of armature stroke) but in the device of the present application such power is not needed at that point. Rather, it is needed at the lower end of the curve and as illustrated provides higher values of magnetic pull for a given air gap. Structurally this is achieved, without increasing the size of the power unit, by providing the power unit with a core of reduced diameter, thereby permitting more copper to be wound thereon, and, hence, more ampere turns without increase in the overall size. Sufficient ampere turns are preferably provided to afford saturation of the iron to give the characteristic illustrated by the curve HI in Figure 7.

The point A on curve HI represents the force necessary to overcome the bias of spring 24 upon energization of the power unit while the slope of line AB represents the spring rate of the spring 24. The net gain accruing from saturation of the iron is represented by the distance AC in as much as the point C would be the maximum force which the spring 24 could exert with the same armature air gap if the power unit had the characteristics represented by the curve H'I'.

Fast and snap action of the contacts is provided together with maintenance of sufficient contact pressure up to the point of contact separation by making the spring rate of the spring 24 low, almost flat, and by correlating this low, almost flat, spring rate to the pull curve of the power unit so as to provide faster increase in the rate of magnetic pull than in the spring rate of the spring 24 beyond the point A (i. e., the point in the movement of the armature to attracted position where the bias of the spring 24 is overcome by the magnetic pull on the armature 16). This difference provides high velocity separation of contacts 27 and 28 and high velocity closing of contacts 27 and 29.

Figures 2, 8:
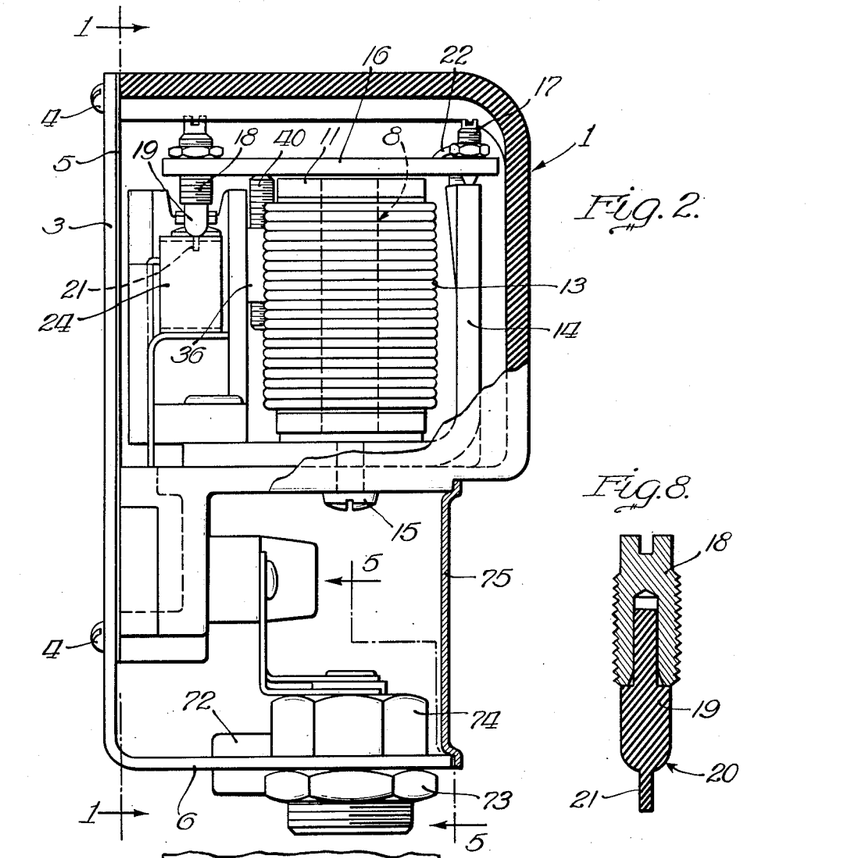
Figure 2 is an end view with the housing partially broken away taken on the line 2—2 of Figure 1.
Figure 8 is an axial sectional view of the adjustable screw through which the biasing action of the biasing spring is applied to the armature.
Figure 3:
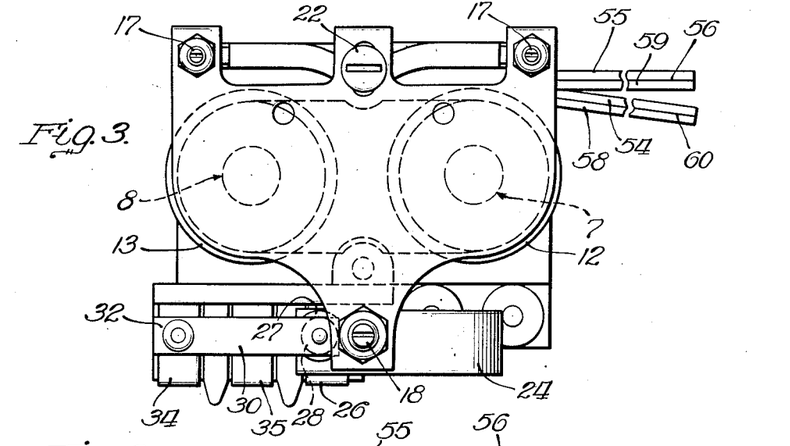
Figure 3 is a plan view of the electromagnetically operated control device shown in Figures 1 and 2 with the housing removed.
Figure 5:
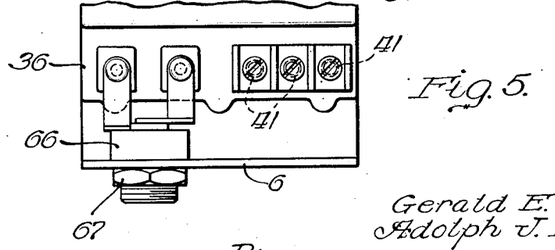
Figure 5 is a fragmentary elevational view taken on the line 5—5 of Figure 2.
Figure 6:
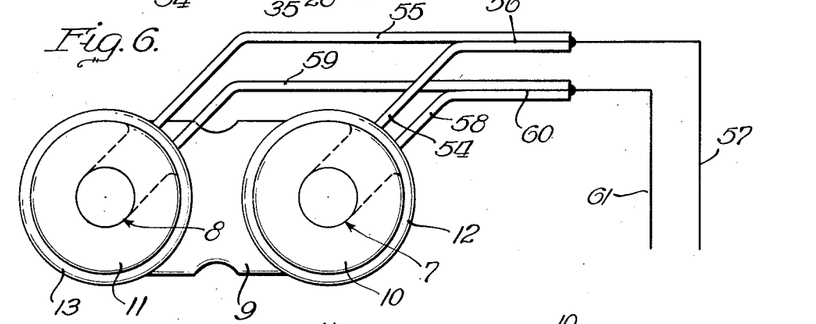
Figure 6 is a plan view of the magnet or power unit assembly showing the lead conductors for the coils thereof.
Figure 6A:
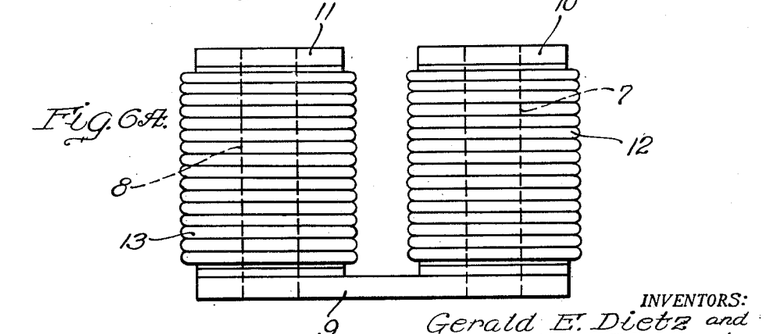
Figure 6A is a side elevational view of the power unit assembly shown in Figure 6.

In the reverse motion, i. e., closing of contacts 27 and 28 and opening of contacts 27 and 29, residual magnetism would ordinarily lower the velocity. In this movement the force of the spring 24 opposes the residual magnetism but is not sufficient to separate contact 27 from contact 29 unless the air gap is held to about point B (Figure 7) or greater. The residual magnetism may be kept lower, without use of special and costly materials, by providing, for example, means for maintaining a minimum air gap between the armature 16 and the pole pieces 10 and 11 when the armature is attracted. Such minimum air gap may be afforded by non-magnetic spacers or by a mechanical stop such as that shown in Figure 2 which comprises a screw 40 screwed into the block 36 or a part associated therewith. The screw 40 may coact directly at its upper end as shown in Figure 2 with the armature 16 to provide a stop therefor for maintenance of minimum air gap. The coaction of the screw 40 with the armature 16 prevents sealing of the armature against the pole pieces 10 and 11. Upon deenergization of the power unit the residual magnetism JK drops off much faster than the spring rate BA of the spring 24, the difference again affording the contact 27 the desired velocity.

The screw 18 is preferably adjustable in its support for adjustment of the armature air gap in relation to the contact air gap, and which, more important, affords adjustment of the pull-in current, i. e., location of the point A on the pull curve HI.

It will be noted that the contact 29 may be mounted on the contact spring 31 or on a spring arm and that the contact 27 preferably engages the contact 29 upon attraction of the armature 16 and before the armature 16 engages the stop 40. As a result the final movement of the armature 16 to attracted position flexes the spring arm or contact spring 31. This assures that contacts 27 and 29 engage before movement of the armature 16 is halted by the stop 40, or by engagement of the armature with the pole faces of the core pieces 7 and 8 where a stop is not utilized, and as a result energy is stored in the leaf spring 31. Upon deenergization of the power unit and retraction of the armature, the energy thus stored causes contact 29 to tend to follow the contact 27 providing contact pressure until the contact 27 has acquired a given velocity of movement (in opposition to residual magnetism, which decreases as the armature air gap increases). The final movement of the armature 16 to attracted position thus stores a certain amount of energy in the contact spring arm 31 which aids the spring 24 in overcoming residual magnetism. This is graphically shown in Figure 7 wherein the line D—E represents the spring rate of leaf spring 31.

Moreover, final movement of armature 16 to attracted position after engaging contact 27 with contact 29 results in slight bending of the spring arm 24 at or near the contact 27. This imparts a rocking or wiping movement to contact 27 with respect to contact 29 with which it is in engagement. A similar rocking or wiping motion takes place upon deenergization of the power unit and tends to shear or overcome any sticking tendency.

A screw 22 screwed for adjustment, for example, in bracket 14 has a head which may function as a backstop for the armature 16. This backstop action of the screw 22 fixes a maximum armature air gap so that the latter is not increased to a value to the right of curve HI at a given location of point A. The screw 22 also prevents the armature from jumping its pivots 17. The adjustment point thereof is ordinarily made at the factory to insure closure of contacts 27 and 28 before armature 16 strikes the head of the screw 22.

Figures 1, 4:
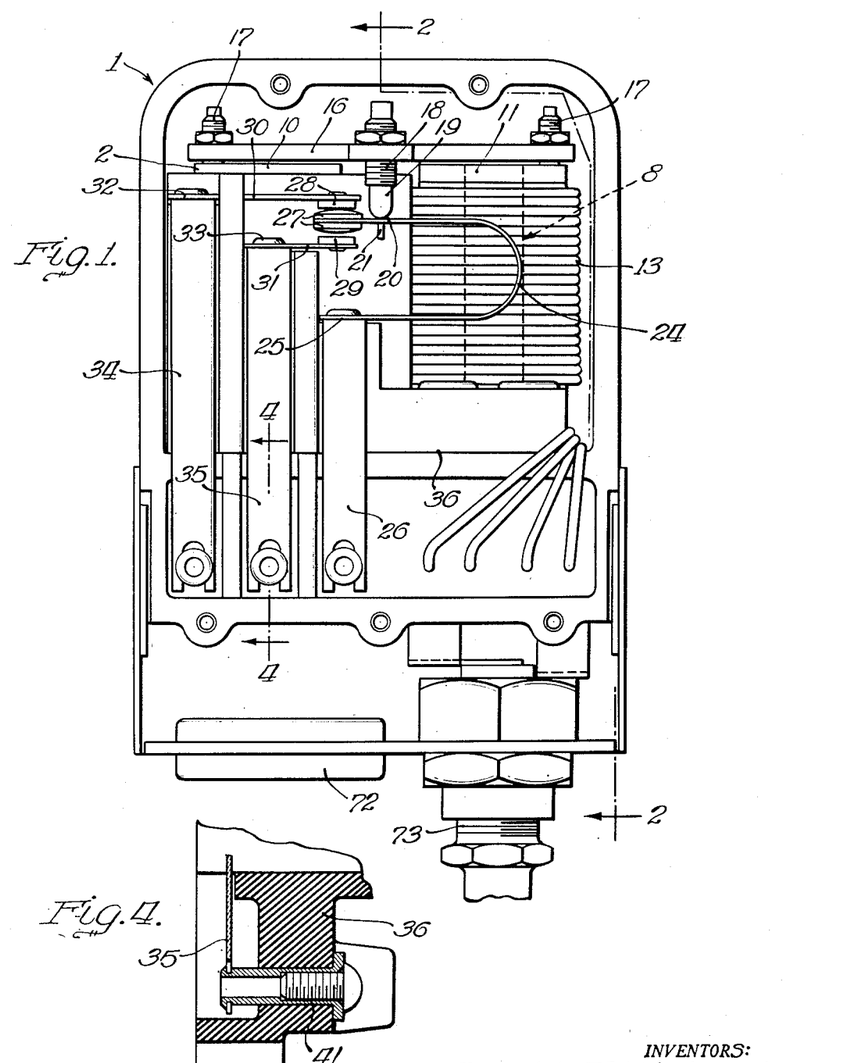
Figure 1 is a rear elevational view of an electromagnetically operated control device in the form of a relay or electromagnetic switch embodying the present invention with the base plate for the case or housing for the device in section taken on the line 1—1 of Figure 2.
Figure 4 is a fragmentary detailed section taken on the line 4—4 of Figure 1.

Each terminal 26, 34 and 35 is connected in circuit with a connector 41 (Figure 4) there being one such connector for each terminal and the several connectors being mounted in the terminal block 36.

Figure 9:
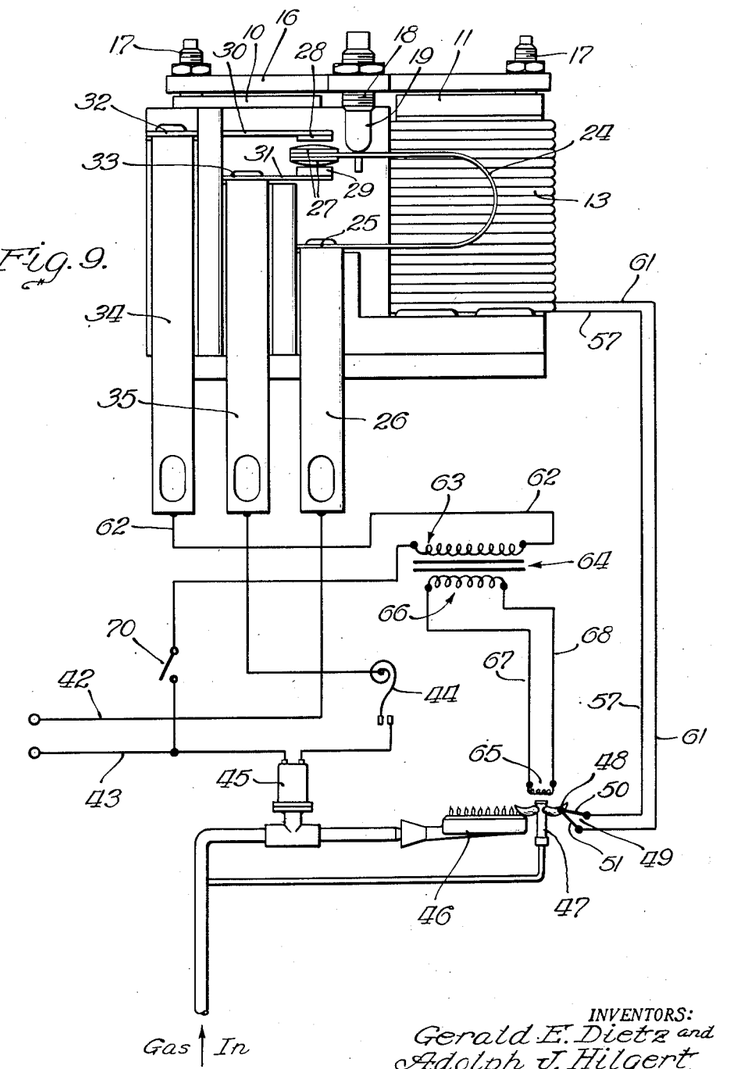
Figure 9 is a diagrammatic view showing one manner in which the switch or relay of the present application may be applied to control a circuit for a solenoid or electro-responsive valve for controlling the flow of gaseous fuel to a main burner which is shown as provided with a pilot burner which when ignited heats a thermocouple or other thermoelectric generator connected in circuit with the coils of the switch or relay.

Referring now to Figure 9 where the switch or relay of the present invention is utilized as a two-terminal device, one of the conductors or line wires 42 of a controlled circuit may be connected to the terminal 26 and the other conductor or line wire 43 may be connected to the terminal 35 with an automatic type thermostat 44 and the coil of an automatic solenoid or electroresponsive valve 45 connected in series circuit relation, for example, in the conductor 43. The valve 45 controls the supply, for example, of gaseous fuel through a fuel supply pipe or conduit to a main burner 46. The burner 46 is provided with a pilot burner 47 which when ignited is adapted to ignite the main burner and also heats the "hot" junction 48 of a thermocouple 49. The thermocouple 49 comprises dissimilar thermocouple elements 50 and 51 joined at the "hot" junction 48. The coils 12 and 13 of the power unit may be connected in circuit with the thermocouple 49 in parallel aiding relation, for example, by connecting the leads 54 and 55 of the coils 12 and 13 together at 56 and connecting the joined leads 54 and 55 to the thermocouple element 50 by a conductor 57 and connecting the leads 58 and 59 of the coils 12 and 13 together at 60 and connecting the joined leads 58 and 59 to the thermocouple element 51 by a conductor 61. Electric power for the circuit 42—43 may be supplied from any suitable source of electric power as indicated by the legend "Power Input" in Figure 9.

Where a third terminal 34 is employed as shown in Figure 9, this third terminal 34 may be connected, for example, to the conductor or line wire 43 by a conductor 62 which may have the primary winding 63 of a transformer 64 in circuit therewith. An electric igniter coil 65 derives power from the secondary winding 66 of the transformer 64 through conductors 67 and 68. This coil is disposed in juxtaposition to the pilot burner 47 for igniting the same. A normally open push button switch 70 may be included in the primary circuit of the transformer 64 and when held closed makes or completes this circuit as long as the coils 12 and 13 of the switch or relay remain deenergized. However, as soon as the pilot burner 47 is ignited by the ignition coil 65 and the thermocouple 49 energizes the relay, it will be seen that the relay automatically opens the igniter circuit.

The conductors leading to the terminals 26, 34 and 35 may enter through the bottom flange 6 of the base plate 3 by way of a grommet 72 and a thermocouple connector assembly 73 extends through and is secured in an opening in the flange 6 by a nut 74 for connecting the thermocouple leads to the coils 12 and 13 as previously described. A cover may be provided at 75.

The operation of the aforedescribed embodiment of the invention is as follows:

Assuming that the thermocouple 49 is generating electricity for supply to the power unit through the aforedescribed circuit, the coils 12 and 13 will be energized and the armature 16 attracted to the pole pieces 10 and 11. The pull on the armature 16 follows the curve HI (Figure 7) and when the point A is reached on this curve the bias of the spring 24 is overcome and the contact 27 separates from the contact 28 and closes into contact with the contact 29 to complete, when the contacts of the thermostat 44 are closed and thus calling for heat, for example, the external circuit 42, 43 for energizing the valve 45 to open the same for fuel flow to the burner. High velocity separation of contact 27 from contact 28 and closing of contact 27 into contact with contact 29 is obtained as previously described. As aforedescribed the contact 27 engages the contact 29 before the armature engages the stop 40 and the final movement of the armature to attracted position against the stop 40 for maintenance of minimum air gap stores a certain amount of energy in the contact spring 31. The wiping or rocking action of the contact 27 with respect to contact 29 has already been described.

Upon deenergization of the power unit the spring 24 opposes residual magnetism. The residual magnetism is kept lower by maintenance of the minimum air gap and upon deenergization of the power unit the residual magnetism drops off much faster than the spring rate BA, the difference affording the contact 27 the desired velocity. The contact 29 tends to follow the contact 27 providing contact pressure until the contact 27 has acquired a given velocity and the energy stored in the contact spring 32 aids the spring 24 in overcoming residual magnetism. As the contact 27 separates from the contact 29 and moves into contact with the contact 28, the circuit 42, 43 opens which, for example, results in closing of valve 45 and shutting off of the fuel flow to the burner until the power unit is again energized whereupon the aforedescribed operation is repeated. As the contact 27 engages the contact 28, the igniter circuit is set for completion by manipulation or holding of the push button switch 70 closed.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

We claim:

1. An electromagnetic control device comprising, means including first and second magnetic members biased toward separated relation and relatively movable against said bias toward attracted relation providing a low reluctance flux path, and means tending to establish flux flow through said flux path at a first level sufficient to initiate high velocity relative attractive movement of said magnetic members against said bias, the density of the flux flow through said path being increased by said attractive movement for a given output of said flux establishing means, said flux path means including a portion having a cross-sectional area of a size to permit flux flow therethrough at said first elvel and saturable by flux flow therethrough at a predetermined higher density level afforded by relative attractive movement of said magnetic members to within a predetermined distance of one another, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under said bias on subsequent shut-off of said flux flow establishing means.

2. An electromagnetic control device comprising, means including first and second magnetic members biased toward separated relation and relatively movable against said bias toward attracted relation providing a low reluctance flux path, coil means operatively associated with said flux path means, and direct current source means connected to energize said coil means and tending to establish flux flow through said flux path at a first level sufficient to initiate high velocity relative attractive movement of said magnetic members against said bias, the density of the flux flow through said path being increased by said attractive movement for a given current flow through said coil means, said flux path means including a portion having a cross-sectional area of a size to permit flux flow therethrough at said first level and saturable by flux flow therethrough at a predetermined higher density level afforded by relative attractive movement of said magnetic members to within a predetermined distance of one another while a predetermined current is flowing through said coil means, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under said bias on subsequent deenergization of said coil means.

3. An electromagnetic control device comprising, means including first and second magnetic members biased toward separated relation and relatively movable against said bias toward attracted relation providing a low reluctance flux path, a coil wound on one of said magnetic members, and thermoelectric generator means connected to energize said coil and tending to establish flux flow through said flux path at a first level sufficient to initiate high velocity relative attractive movement of said magnetic members against said bias, the density of the flux flow through said path being increased by said attractive movement for a given current flow through said coil, said flux path means including a portion having a cross-sectional area of a size to permit flux flow therethrough at said first level and saturable by flux therethrough at a predetermined higher density level afforded by relative attractive movement of said magnetic members to within a predetermined distance of one another while a predetermined current is flowing through said coil, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under said bias on subsequent deenergization of said coil.

4. An electromagnetic control device comprising, means including first and second magnetic members biased toward separated relation and relatively movable against said bias toward attracted relation providing a low reluctance flux path, a coil wound on said first magnetic member, direct current source means connected to energize said coil and tending to establish flux flow through said flux path at a first level sufficient to initiate high velocity relative attractive movement of said magnetic members against said bias, the density of the flux flow through said path being increased by said attractive movement for a given current flow through said coil, said first magnetic member being formed with a reduced portion having a cross-sectional area of a size to permit flux flow therethrough at said first level and saturable by flux flow therethrough at a predetermined higher density level afforded by relative attractive movement of said magnetic members to within a predetermined distance of one another while a predetermined current is flowing through said coil, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under said bias on subsequent deenergization of said coil, said coil being wound on said reduced portion to afford maximum turns for a given length of wire and thereby maximum ampere-turns for a given value of current flowing through said length of wire to initiate said high velocity attractive movement.

5. An electromagnetic control device comprising, means including a magnetic core and a cooperating magnetic armature biased toward a retracted position and movable against said bias toward an attracted position with respect to said core providing a low reluctance flux path, a coil wound on said core, thermoelectric generator means connected to energize said coil and tending to establish flux flow through said flux path at a first level sufficient to initiate high velocity attractive movement of said armature against said bias, the density of the flux flow through said path being increased by said attractive movement for a given current flow through said coil, said core being formed with a reduced portion having a cross-sectional area of a size to permit flux flow therethrough at said first level and saturable by flux flow therethrough at a predetermined higher density level afforded by attractive movement of said armature to within a predetermined distance of said core while a predetermined current is flowing through said coil, saturation of said saturable portion limiting the flux flow through said flux path means to said predetermined higher density level in spite of further attractive movement of said armature toward said attracted position tending to increase said flux density, thereby minimizing residual magnetism to permit quick retraction of said armature under said bias on subsequent deenergization of said coil, said coil being wound on said reduced portion to afford maximum turns for a given length of wire and thereby maximum ampere-turns for a given value of current flowing through said length of wire to initiate said high velocity attractive movement.

6. An electromagnetic control device comprising, means including a magnetic generally U-shaped core having a pair of pole pieces each terminating in an enlarged pole face portion and a cooperating magnetic armature biased toward a retracted position and movable against said bias toward an attracted position with respect to said pole face portions providing a low reluctance flux path, a coil having a portion wound on each of said pole pieces, a thermoelectric generator connected to energize said coils and tending to establish flux flow through said flux path at a first level sufficient to initiate high velocity attractive movement of said armature against said bias, the density of the flux flow through said path being increased by said attractive movement for a given current flow through said coil, said pole pieces each being formed with a reduced portion having a cross-sectional area of a size to permit flux flow therethrough at said first level and saturable by flux flow therethrough at a predetermined higher density level afforded by attractive movement of said armature to within a predetermined distance of said pole face portions while a predetermined current is flowing through said coil, saturation of said saturable portions limiting the flux flow through said flux path means to said predetermined higher density level in spite of further attractive movement of said armature toward said attracted position tending to increase said flux density, thereby minimizing residual magnetism to permit quick retraction of said armature under said bias on subsequent deenergization of said coil, said coil being wound on said reduced portions to afford maximum turns for a given length of wire and thereby maximum ampere-turns for a given value of current flowing through said length of wire to initiate said high velocity attractive movement.

7. An electromagnetic control device comprising, means including first and second magnetic members having separated relation and relatively movable toward attracted relation providing a low reluctance flux path, first spring means having a low and substantially flat spring rate biasing said magnetic members toward separated relation, means tending to establish flux flow through said flux path at a first level sufficient to initiate high velocity relative attractive movement of said magnetic members against the bias of said first spring means, the density of the flux flow through said path being increased by said attractive movement for a given output of said flux establishing means, and second spring means in which energy is stored by attractive movement of said magnetic members after predetermined initial attractive movement thereof, said flux path means including a portion having a cross-sectional area of a size to permit flux flow therethrough at said first level and saturable by flux flow therethrough at a predetermined higher density level afforded by relative attractive movement of said magnetic members to within a predetermined distance of one another, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under the bias of both of said first and second spring means on subsequent shut-off of said flux flow establishing means.

8. An electromagnetic control device comprising, means including first and second magnetic members having separated relation and relatively movable toward attracted relation providing a low reluctance flux path, first spring means having a low and substantially flat spring rate biasing said magnetic members toward separated relation, a coil wound on said first magnetic member, a thermoelectric generator connected to energize said coil and tending to establish flux flow through said flux path at a first level sufficient to initiate high velocity relative attractive movement of said magnetic members against the bias of said first spring means, the density of the flux flow through said path being increased by said attractive movement for a given current flow through said coil, and second spring means in which energy is stored by attractive movement of said magnetic members after predetermined initial attractive movement thereof, said first magnetic member being formed with a reduced portion having a cross-sectional area of a size to permit flux flow therethrough at said first level and saturable by flux flow therethrough at a predetermined higher density level afforded by relative attractive movement of said magnetic member to within a predetermined distance of one another while a predetermined current is flowing through said coil, saturation of said saturable portion limiting the flux flow through said flux path means to said predetermined higher density level in spite of further attractive movement of said magnetic members to attracted relation tending to increase said flux density, thereby minimizing residual magnetism to permit quick separation of said magnetic members under the bias of both of said first and second spring means on subsequent deenergization of said coil, said coil being wound on said reduced portion to afford maximum turns for a given length of wire and thereby maximum ampere-turns for a given value of current flowing through said length of wire to initiate said high velocity attractive movement.

9. An electromagnetic control device comprising, means including a magnetic core and a cooperating magnetic armature having a retracted position and movable toward an attracted position with respect to said core providing a low reluctance flux path, an elongated first leaf spring having a low and substantially flat spring rate biasing said armature toward retracted position, a coil wound on said core, a thermoelectric generator connected to energize said coil and tending to establish flux flow through said flux path at a first level sufficient to initiate high velocity attractive movement of said armature against the bias of said first leaf spring, the density of the flux flow through said path being increased by said attractive movement for a given current flow through said coil, and a second relatively short leaf spring having a variable spring rate positioned for engagement by said first leaf spring for storage of energy therein by attractive movement of said armature after predetermined initial attractive movement thereof, said core being formed with a reduced portion having a cross-sectional area of a size to permit flux flow therethrough at said first level and saturable by flux flow therethrough at a predetermined higher density level afforded by attractive movement of said armature to within a predetermined distance of said core while a predetermined current is flowing through said coil, saturation of said saturable portion limiting the flux flow through said flux path means to said predetermined higher density level in spite of further attractive movement of said armature to attracted relation tending to increase said flux density, thereby minimizing residual magnetism to permit quick retraction of said armature under the bias of both of said first and second leaf springs on subsequent deenergization of said coil, said coil being wound on said reduced core portion to afford maximum turns for a given length of wire and thereby maximum ampere-turns for a given value of current flowing through said length of wire to initiate said high velocity attractive armature movement.

10. An electromagnetic control device comprising, means including a generally U-shaped magnetic core having a pair of pole pieces each terminating in an enlarged pole face portion and a cooperating magnetic armature having a retracted position and movable toward an attracted position with respect to said pole face portions providing a low reluctance flux path, an elongated first leaf spring having a low and substantially flat spring rate biasing said armature toward retracted position, a first contact carried by said first leaf spring, a coil having a portion wound on each of said pole pieces, a thermoelectric generator connected to energize said coil and tending to establish flux flow through said flux path at a first level sufficient to initiate high velocity attractive movement of said armature against the bias of said first leaf spring, the density of the flux flow through said path being increased by said attractive movement for a given current flow through said coil, a second relatively short leaf spring having a variable spring rate, and a second contact carried by said second leaf spring positioned for quick make engagement by said first contact after predetermined initial attractive movement of said armature, said engagement affording storage of energy in said second leaf spring by subsequent attractive movement of said armature, said pole pieces each being formed with a reduced portion having a cross-sectional area of a size to permit flux flow therethrough at said first level and saturable by flux flow therethrough at a predetermined higher density level afforded by attractive movement of said armature to within a predetermined distance of said pole face portions while a predetermined current is flowing through said coil, saturation of said saturable portions limiting the flux flow through said flux path means to said predetermined higher density level in spite of further attractive movement of said armature to attracted relation tending to increase said flux density, thereby minimizing residual magnetism to permit quick retraction of said armature under the bias of both of said first and second leaf springs and quick break disengagement of said contacts on subsequent deenergization of said coil, said coil being wound on said reduced core portions to afford maximum turns for a given length of wire and thereby maximum ampere-turns for a given value of current flowing through said length of wire to initiate said high velocity attractive armature movement.

11. An electromagnetic operator comprising an electromagnet, an armature movable toward and away from said electromagnet, and pivotal mounting means for said armature comprising a pair of pivot pins carried by said armature and each having a pointed tip portion on the side of said armature adjacent said electromagnet, a bearing member fixed with respect to said electromagnet and formed with bearing groove means affording seats for pivotal coaction with the pointed tip portion of said pivot pins, and a stop screw threaded into said bearing member and having a head portion engageable by retractive movement of said armature with the opposite side of said armature at a point offset from the alignment of said pivot pins, said stop screw preventing displacement of said pivot pins from seated relation and also defining a maximum air gap position of said armature.

12. An electromagnetic operator comprising an electromagnet, an armature movable toward and away from said electromagnet and formed with an opening therein, a pair of pivot pins carried by said armature and each having a pointed tip portion on the side of said armature adjacent said electromagnet, a bearing member fixed with respect to said electromagnet and formed with bearing groove means affording seats for pivotal coaction with the pointed tip portion of said pivot pins, and a stop screw threaded into said bearing member and extending loosely through said armature opening, said screw having a head portion engageable by retractive movement of said armature with the opposite side of said armature at a point offset from the alignment of said pivot pins, said stop screw coacting with the margins of said armature opening to prevent substantial lateral movement of said armature in the direction of said groove means, and the coaction of the head of said screw with said armature preventing displacement of said pivot pins from seated relation and also defining a maximum air gap position of said armature.

References Cited in the file of this patent

UNITED STATES PATENTS

| Number | Name | Date |
|---|---|---|
| 374,872 | Hochhausen | Dec. 13, 1887 |
| 803,825 | Hilliard | Nov. 7, 1905 |
| 972,424 | Williams | Oct. 11, 1910 |
| 1,253,001 | Cole | Jan. 8, 1918 |
| 1,446,780 | Balzer | Feb. 27, 1923 |
| 1,970,333 | Muehter | Aug. 14, 1934 |
| 2,040,677 | Suits | May 12, 1936 |
| 2,264,986 | Kovalsky | Dec. 2, 1941 |
| 2,267,775 | Wetzel | Dec. 30, 1941 |
| 2,332,268 | Shaw | Oct. 19, 1943 |
| 2,349,443 | McCarty | May 23, 1944 |
| 2,351,448 | Neuner | June 13, 1944 |
| 2,423,116 | Price | July 1, 1947 |
| 2,449,086 | Price | Sept. 14, 1948 |
| 2,462,894 | Price | Mar. 1, 1949 |
| 2,505,225 | Akroyd | Apr. 25, 1950 |
| 2,669,621 | Duffing | Feb. 16, 1954 |

FOREIGN PATENTS

| Number | Country | Date |
|---|---|---|
| 120,376 | Great Britain | July 3, 1919 |
| 267,799 | France | July 1, 1950 |
| 400,615 | Italy | Dec. 18, 1942 |